United States Patent [19]

Baker

[11] 4,044,180

[45] Aug. 23, 1977

[54] SHEET STRUCTURE

[76] Inventor: Robert C. Baker, 1395 Northwestern Natl. Bank Bldg., St. Paul, Minn. 55101

[21] Appl. No.: 573,834

[22] Filed: May 2, 1975

Related U.S. Application Data

[63] Continuation-in-part of Ser. No. 338,963, March 7, 1973, abandoned, which is a continuation-in-part of Ser. No. 192,241, Oct. 26, 1971, abandoned, and Ser. No. 300,788, Oct. 25, 1972, Pat. No. 3,776,644.

[51] Int. Cl.$^2$ .................. B65D 29/02; B32B 27/36
[52] U.S. Cl. ................................. 428/35; 206/604; 428/213; 428/287; 428/292; 428/332; 428/411; 428/483; 428/515; 428/480
[58] Field of Search ............... 428/35, 36, 287, 292, 428/297, 317, 480, 483, 213, 332, 515; 229/68, 51 WB; 206/438, 498

[56] References Cited

U.S. PATENT DOCUMENTS

| | | | |
|---|---|---|---|
| 2,474,619 | 6/1949 | Farrell et al. | 428/320 |
| 3,001,689 | 9/1961 | Burton | 229/51 WB |
| 3,255,875 | 6/1966 | Tierney | 428/294 |
| 3,455,720 | 7/1969 | Davies et al. | 428/332 |
| 3,817,821 | 6/1974 | Gallini | 428/216 |

OTHER PUBLICATIONS

*Modern Plastics Encyclopedia*, vol. 46, No. 10A, Oct. 1969, McGraw-Hill, p. 374.

*Primary Examiner*—George F. Lesmes
*Assistant Examiner*—P. J. Thibodeau
*Attorney, Agent, or Firm*—Robert C. Baker

[57] ABSTRACT

The new composite flexible sheet material comprises a base sheet structure made up of a thermoplastic resin layer which is flowable or fusible at predetermined sealing conditions, plus a polyester backing layer non-flowable or non-fusible at said conditions. The thermoplastic layer is thicker than the backing layer. Adhered to the thermoplastic layer is a layer of polyester fibrous material not flowable or fusible at said sealing conditions. The fibrous material layer is capable of being substantially submerged into the thermoplastic layer upon the application of sealing conditions. A preferred invertible envelope-type packet is formed by using a composite sheet having a thermoplastic fusible layer and a non-fusible backing layer, and involves placing the thermoplastic layer inwardly and the backing layer on the exterior of the envelope. Opposing walls of the envelope are united along portions thereof adjacent the envelope cavity. The expanse of the sheet material forming each opposing wall extends beyond a seal structure along one edge of the envelope cavity to form a pair of outwardly projecting ear-flaps. Sheet material forming one of the ear-flaps is folded back upon itself over the thermoplastic layer side thereof. Part of this folded back portion extends as a partition member substantially throughout the seal structure along the one edge; and this seal structure along said one edge is temporary and rupturable at the interface between the backing layer of the partition member and the thermoplastic layer of the opposing sheet.

8 Claims, 3 Drawing Figures

SHEET STRUCTURE

This application is a continuation-in-part of Ser. No. 338,963, filed Mar. 7, 1973, and now abandoned, which in turn is a continuation-in-part of Ser. No. 192,241 filed Oct. 26, 1971, now abandoned, and Ser. No. 300,788 filed Oct. 25, 1972 and now U.S. Pat. No. 3,776,644.

This invention relates to package strutures in the form of discardable flexible envelope-like containers (preferably easily convertible to pocket applicators), and more particularly to improved temporary seal structures for such containers, and to methods for forming such seal structures. The invention also relates to a new composite flexible sheet material especially useful in the packaging art.

The discardable or disposable applicator packets of the invention may be used for the packaging of a variety of ingredients or products, including solid (such as nuts and bolts or other articles or substances) or powdery as well as pasty or liquid ingredients. The packets are especially useful to package messy spreadable compositions such as various polishes, cleaners, toiletry compositions, pastes, creams, lotions, oils, paints, waxes, etc.

Further, an envelope-type container package in which teachings of this invention also are useful is taught and claimed in U.S. patent application Ser. No. 806,983, filed on Mar. 13, 1969, and issued on Mar. 7, 1972 as U.S. Pat. No. 3,647,305, of which the present applicant is a joint inventor.

The new composite flexible sheet material includes a base sheet structure and a layer of fibrous material fixed upon one side of the base sheet structure. The base sheet structure itself is a composite of layers, and includes a thermoplastic polymeric resin layer which is flowable and sealable or fusible at predetermined sealing conditions of elevated temperature and pressure, plus a backing polyester layer which is substantially non-flowable or non-fusible or non-heat-sealable at those predetermined sealing conditions. The thermoplastic layer of the base sheet structure is of greater thickness than the backing layer. On the side of the base sheet structure opposite the backing layer is located a layer of exposed fibrous material comprising polyester resin fibers. The fibrous layer is adhered to and exposed on (suitably projecting outwardly from) the thermoplastic layer side of the base sheet structure. It may be directly adhered to the thermoplastic layer, or optionally to a heat dispersible or fragible very thin film coating over the bulk or body of the thermoplastic layer. The quantity or thickness relationship between the fibrous layer and the thermoplastic layer is such that the fibrous layer is capable of being substantially submerged into the thermoplastic layer upon the application of predetermined sealing conditions of elevated temperature and mild pressure as common in any of a variety of heat-sealing techniques.

Preferably, the fibrous layer of the composite sheet includes polyester fibers accounting for at least 50% of the weight of that layer. A fibrous layer consisting of polyester fibers is especially advantageous; and especially useful polyester fibers are those of polyethylene terephthalate or equivalent. These fibers, although sometimes considered to be thermoplastic, are not as a practical matter of such thermoplasticity or thermoplastic character as to be useful in forming heat-seals. They do not flow and fuse at commercially practicable heat-sealing conditions, such as temperatures from about 50° or 60° C up to about 150° or even 250° C. Even at higher temperatures, they do not behave well as heat-sealable material. Thus, they are not characterized as heat-sealable; and they are not characterized as "thermoplastic"]-herein. Yet such fibers exhibit extraordinarily desirable properties in sheet materials used for envelope-like containers convertible to pocket applicators. Many ingredients most usefully packaged in such containers are messy spreadable compositions (for example, shoe polish). These compositions sometimes contain small amounts of an organic diluent or other migratable organic material. The diluent or migratable organic material should remain as part of the composition instead of being irretrievably absorbed or adsorbed into fibrous material of the container. Such compositions should be mechanically carried by the irregularities of a recess-containing fibrous layer, and in that sense be "absorbed"; but they should not be irretrievably taken-up by the fibers. Polyesters tend to exhibit minimal, if any, irretrievable adsorption or absorption of such diluent or migratable constituents. Further, polyester fibers can be formed so as to be relatively free of frayed projections outwardly from the main body or filament of the fiber, which also tends to reduce irretrievable adsorption or absorption of diluents.

The package article or packet hereof is a disposable flexible envelope-like container, preferably convertible to a pocket applicator. Its opposing walls are formed of flexible sheet material; and a packaged ingredient or product is within the envelope cavity between the opposing walls of the container. The flexible sheet material of the package includes a fusible thermoplastic layer and a non-fusible backing layer having a non-fibrous rear surface. These layers are respectfully fusible and non-fusible at predetermined sealing conditions of elevated temperature and pressure.

The fusible thermoplastic layer faces toward the interior of the envelope cavity, with the backing layer facing toward the exterior. Sheet material forming the opposing walls of the envelope is united along all portions thereof immediately adjacent peripheral limits of the envelope cavity, with all portions in face-to-face relationship adjacent the peripheral limits being united by seal structures. The expanse of the sheet material forming each opposing wall is sufficient in size to extend beyond a seal structure along one edge of the envelope cavity to form a pair of outwardly projecting ear-flaps for finger gripping. The sheet material of one of the outwardly projecting ear-flaps is folded back upon itself over the fusible layer side thereof; that is, the backing side of the sheet material is outside or on the exterior after the fold is made. Part of the folded back portion extends as a partitition member substantially throughout the seal structure along the one edge of the envelope. Preferably, the terminal end of the folded back portion extends beyond the seal structure along this one edge and into the cavity of the packet just sufficiently to serve as an internal protector flap for the seal. This seal structure along the one edge is temporary and rupturable at the interface between the non-softenable (as the term is used herein) or non-fusible non-heat-sealable backing layer of the partition member and the heat-softenable or fusible layer of the opposing sheet material (of the opposite ear-flap) in contact therewith. All other seal structures adjacent peripheral limits of the envelope cavity are preferably permanent.

The ear-flaps are each adapted to be gripped between a thumb and forefinger and drawn apart to rupture the temporary seal and simultaneously form the container into a pocket. Preferably, this pocket is capable of being turned inside out for direct application of any packaged messy ingredients to a surface. Fingers inserted into the inverted pocket are protected against contamination during hand application of the packaged ingredients (which ingredients, after inversion of the pockets, are on the exterior thereof).

Not only is this new envelope-type container easily and economically formed using various standard heat-sealing temperatures and pressures for all seal structures, without required special adjustment of temperatures or pressures to form the temporary seal structure; but in addition, the character of the temporary seal structure is such that it is not easily ruptured accidentally during ordinary handling of the packet in commerce, but is easily ruptured and cleanly ruptured when a user of the packet pulls apart the ear-flaps.

Preferably, the container includes a recess-containing layer means.

Additional features and benefits of the teachings herein will become evident as this description proceeds.

The invention is described with the aid of a drawing, made a part hereof, wherein.

Figure 1:
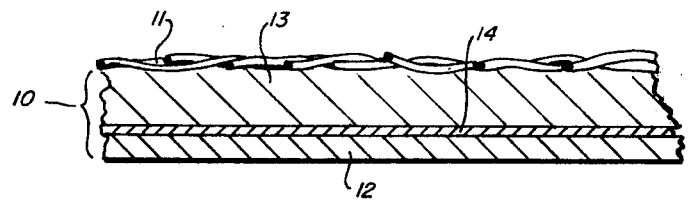
FIG. 1 is a schematic cross-section through the new composite flexible sheet material hereof.

The composite flexible sheet material of the invention comprises a base sheet structure 10 of at least two different layers, and a layer 11 of fibrous material fixed to the base sheet structure 10. The fibrous layer 11 may be woven or non-woven. Generally, it will extend over one entire side of the base sheet structure 10 and be coextensive therewith.

The fibers of the fibrous layer 10 are polyester fibers; at least 50% of the weight of the fibrous layer is accounted for by polyester fibers, with a minor optional proportion permissibly non-polyester in character (such as, for example, glass or a polyamide known as nylon, or even possibly an acetate). A linear polymeric polyester of monomers of terephthalic acid and ethylene glycol is one preferred illustrative polyester. Generally, the most preferred polyesters are formed of monomers of aromatic organic dicarboxylic or tricarboxylic acids and monomers of alcohols containing at least two hydroxyl groups. Optionally additional groups or short chains may be present in the monomers. These polyesters are substantially non-adsorptive or non-absorptive of the diluents and migratable lower molecular weight organic constituents sometimes included in shoe and other polishing compositions; and this is an important feature for the substantial preservation of packaged compositions so that they remain effective for their intended purpose after storage during shipment and display.

The base sheet structure of the new composite sheet material includes a backing layer or film 12 having a non-fibrous rear or outer exposed surface. Film 12 is essentially non-flowable or non-fusible or non-heat-sealable at predetermined sealing conditions of elevated temperature from about 60° to 150° C or even 250° C. Such temperatures are useful for sealing the heat-sealable thermoplastic layer 13 of the base sheet structure. The backing layer 12 also is a polyester material comparable to the polyester composition of the fibrous layer. Polyethylene terephthalate or equivalent is especially useful. It may be as thin as about 5 microns, but usually will be at least about one-fourth mil, up to about 40 or 60 microns in thickness. It is preferably as thin as possible while retaining substantial dimensional stability and contributing to dimensional stability for the composite sheet. Normally, the outer side of the backing layer 12 will be smooth and free of any coating; but it may have an optional coating for low or an adjusted degree of adhesion of thermpolastic material, if desired.

United to the non-sealable (i.e., non-fusible as used herein) backing film 12 may be, and preferably is, a film 14 or coating of barrier properties contributing to the fluid-imperviousness of the composite sheet. (Inorganic barriers of Jones U.S. Pat. No. 3,442,686 can be used.) Vinylidene containing polymers (such as vinylidene chloride containing polymers as in the commercial product "Saran" of Dow Chemical Company) are useful in this respect. Thicknesses from about 5 to 40 or 60 microns are most useful for this special layer. The tendency of polymers of vinylidene chloride (or other vinylidene halides such as fluorine) to shrink and excessively distort under some elevated heat-sealing conditions (where resistance heating is employed, for example) is masked or essentially overcome by the fact that this layer is thin and is unified to the relatively dimensionally-stable polyester backing.

The next layer 13, which optionally may be applied directly upon the polyester backing (in those cases where an auxiliary barrier layer may be omitted for the particular ingredients or products one intends to enclose in the packaging film), is that of a heat-flowable and heat-sealable thermoplastic polymeric resin. To be recognized is that the material of the barrier layer 14, contributing to substantial fluid-imperviousness and even vapor imperviousness, may also satisfy the properties of a heat-sealable thermoplastic layer 13 as here discussed. Polyethylene, however, is an especially useful heat-sealable resin; but polyvinyl chloride (or even polyvinylidene chlorides) may be employed, if desired, especially when dielectric heat-sealing techniques are to be employed in making a package. Still other known polymeric heat-sealable or thermoplastic resins of relatively non-adhesive or non sticky properties at room temperature may be used. Thus polyacrylates of such properties are useful. But the most economical polymeric heat-sealable thermoplastic resin of desirable properties appears to be polyethylene. Depending upon the polymerization technique and extend of polymerization for polyethylene (including cross-linking, if any), the extent of elevation of temperature required for sealing will vary. Elevated sealing temperatures from about 50° C or possibly 70° C up to about 100° C or possibly 150° C are most preferred. While the elevated temperature for sealing is important, not to be ignored is the need for at least mild pressures pushing or pressing juxtaposed areas to be sealed together. As a general principle, the mild pressure needed to accomplish a seal between two surfaces may be decreased as the temperature employed for sealing is increased.

Important it is that the total thickness of what is termed herein the thermoplastic or fusible layer 13 must be of such magnitude or bulk or quantity that the thermoplastic layer is capable of swallowing-up the layer of fibrous material 11 of the composite sheet at the predetermined sealing conditions of mild pressure and elevated temperature. Thus the thermoplastic layer is always at least about 1 mil (25 microns) thick, and may be as thick as 2 or 3 or even possibly 5 mils (125 microns) thick. Above about 5 mils thick, the bulk of the layer starts to cause more stiffening of the composite sheet than is desirable for convenient usage of the sheet to form invertible pockets. But in a relative sense, even greater thickness, up to about 12 mils (300 microns), may be employed where package invertability is not critical, or where fusible layer 13 is not in preferred film form but is porous or formed using fibrous fusible elements.

The thickness of the fibrous layer 11 (which is an open layer of fibers or filaments) may be even greater than the thermoplastic layer 13 and still lie within the bulk range permitting complete submersion of the fibrous layer into the thermoplastic layer under sealing conditions. The reason for this is because the fibrous layer contains a good deal of open space between fibers (analogous to open space in "cheese" cloth or the open space in a scrim of non-woven swirled filaments formed by a "Rondo" web technique). Thus, compression of it removes the open spaces from it; and the actual compressed thickness of space occupied by the mass of the fibers per se in it is much less than (no greater than about half) the overall thickness of the non-compressed fibrous layer as it is attached or fixed to the base sheet structure. Generally, the overall thickness of the "open" or non-crushed fibrous layer, as part of the total sheet, will lie within the range of 1 or 2 mils (25 or 50 microns) up to possibly 8 mils (200 microns) or even 12 mils (300 microns). A thickness as great as 20 mils (500 microns) or even a millimeter may sometimes be useful. However, the diameter size of fibers in the fibrous layer must never exceed the approximate thickness of the heat-sealable thermoplastic resin layer; and in this connection, diameter sizes above about 75 or 80 microns are undesirable, whereas diameter sizes below about 25 or 30 or even 40 microns down to about a micron or so are especially preferred. Also, the fully compressed thickness of material forming the fibrous layer should normally be no greater than about the thickness of the heat-sealable layer, and preferably is less. However, where the fibrous layer is exceedingly open, with fibers of it relatively loosely spaced and randomly intersecting throughout the layer, sufficient open space through it may permit flow of thermoplastic resin through it as it is subjected to compression in heat-sealing; and this type of relationship can result in complete submersion of the fibrous layer even when its compressed thickness exceeds by about 25% or so the thickness of the thermoplastic layer. The reason for this is that the thermoplastic resin, as it "swallows" the fibers, is forced up through the open spaces of the fibrous layer and therefore is "expanded" in thickness as the fibers are submerged in it. Caution must be exercised when such bulk is employed for the fibrous layer inasmuch as the movement of the thermoplastic resin through it during sealing must be sufficiently extensive to present a layer of sealable thermoplastic resin over the fibers in order to achieve a good sealing contact to a juxtaposed substrate surface.

In brief, the composite sheet of this invention is one with thermoplastic material within the sheet and with polyester material on each side of the thermoplastic layer. Other layers in the structure are permissible so long as the functional performance of the composite sheet under sealing conditions is retained. For example, a fragible or dispersible layer of low-cohesive strength resin or an inorganic material (such as, for example, a vapor deposited metal layer to create opacity) may be included. Compatible plasticization of the resins in the various layers of the sheet may be employed where desired to improve flexibility of the layer and, in the case of the thermoplastic layer, to adjust the composition of it to achieve sealing under modified conditions of heat and pressure. In this connection, heat-sealing, as used herein, refers to any of a variety of techniques (resistance heating, dielectric heating, ultrasonic heating, etc.) for creating the localized elevated temperature and mild pressure to accomplish a fusion-type seal. Further, exceedingly thin priming layers may be employed in a known manner to increase anchorage between the main layers aforediscussed; or chemical-type bonding as sometimes heretofore practiced may be employed.

A variation of the composite sheet which makes possible relatively firm seals which are relatively easily separated by a user is that wherein a majority (over 50%; preferably over 60%) of the weight of the fibers in the fibrous layer (which preferably is a non-woven layer) are oriented filaments at least about 2 or 3 centimeters in length up to an indefinite length (as long as the sheet backing). In this variation, the fibers (at least the majority of the weight of the fibers) are oriented to extend in substantially the same direction in the fibrous layer; and they are placed in a more or less parallel relationship to the base sheet structure. While substantially parallel over the base sheet surface, they preferably also do intersect at relatively narrow angles in a random manner, and are substantially bonded or united together at such intersections. Can illustrative polyester fibrous layer of such character may be formed using "Reemay", which is a spunbonded polyester filament sheet of E. I. DuPont.) Parts or sections of such aligned filaments or fibers are in contact with and thermoplastically stuck or attached to the thermoplastic layer (which suitably may be "Saranex", that is, polyethylene between outer layers of polyvinylidene chloride) of the base sheet structure. Thus, parallel oriented long filaments (of at least 2 or 3 centimeters) account for the majority of the weight of the fibrous layer in this structure.

In use, packages are conveniently formed by placing the fibrous side of the sheet material in face-to-face contact, with the non-sealable backing on the exterior. Heat seals are formed by any of a variety of conventional techniques; and in the process, the fiber material submerges in the area of the seal into the heat-sealable layer. The flow or oozing of the heat-sealable resin through the fibrous layer causes the heat-seal resin from each side of the package to merge and form a seal.

What makes the aligned fiber variation of the composite sheet especially desirable is the character of the resulting seal between face-to-face contacting surfaces of the fibrous side of the sheet. Suitable, in forming such a seal, the composite sheet material is first folded so as to place its backing layer on the outside, with the fibrous layer inside. A seal line or narrow band of about one centimeter or less in width is formed to traverse across the aligned filaments of the fibrous layer of the opposing sheets. The line of seal extends in a direction substantially perpendicular to the direction of filament alignment (so that the alignment of filament is approximately perpendicular to the seal line). Such a seal is more easily ruptured by pulling apart outward projections of the sheet material from the line of the seal than a comparable seal formed using composite sheets of totally randomly distributed fibers. Filament strength and orientation gives this result.

Figure 2:
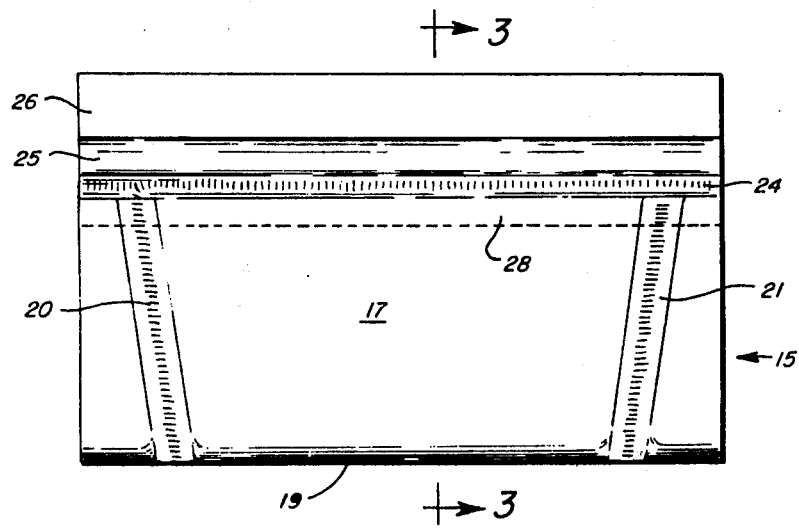
FIG. 2 is a schematic plan side view of a packet according to the invention.
Figure 3:
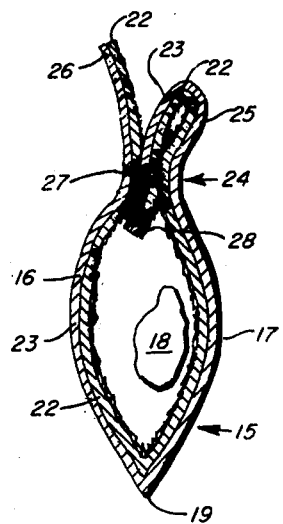
FIG. 3 is a schematic cross-sectional view taken on line 3—3 of FIG. 2.

A preferred package according to the invention will now be explained. Referring to FIGS. 2 and 3, the envelope container 15 has opposing walls 16 and 17 of flexible sheet material with a packaged ingredient or product 18 within the envelope cavity between those walls. The sheet material employed may be foled at a fold 19 as illustrated; or two separate sheets may be juxtaposed and the bottom edge joined by a seal structure. Lateral seal structures 20 and 21 join the lateral end seals 20 and 21 usually are permanent. Sheet material of opposing walls of the envelope is united along all portions thereof adjacent the peripheral limits of the envelope cavity; and all portions in face-to-face relative relationship are united by seal structures. No seal structure is needed along the folded bottom edge 19.

The sheet material used to form this envelope container has a thermoplastic layer 22 which is fusible or heat-softenable at predetermined seal conditions of elevated temperature and pressure, and an outer backing layer 23 having a non-fibrous surface which is non-fusible at such conditions; and sheet materials aforediscussed are ideal to employ. The fusible layer faces inwardly in the envelope.

The expanse of the sheet material forming each opposing wall 16 and 17 of the envelope is sufficient in size to extend beyond a seal structure 24 along one edge of the envelope cavity so as to form a pair of outwardly projecting ear-flaps 25 and 26 for finger-gripping. However, one of these ear-flaps, that is, the sheet material forming one of these ear-flaps 25, is formed into a special structure which influences the structure of the temporary seal 24 along the one edge of the cavity.

The sheet material forming ear-flap 25 is folded back upon itself over the heat-softenable layer side 22 thereof. Part of the folded back portion extends as a partition 27 substantially throughout the seal structure 24 along the one edge; and this seal structure 24 is characterized as temporary since it is designed for relatively convenient rupture at the time of consumer opening of the envelope packet to gain access to packaged material. In this temporary seal structure, rupture is accomplished at the interface between the non-softenable backing layer 23 of the partition member (i.e., part of the folded back portion of one ear-flap 25 sheet projection) and the heat-softenable or fusible layer 22 of the opposing sheet material of ear-flap 26 in contact with that partition member 27 at the temporary seal structure. The interface between the fusible softenable layer 22 on each side of the folded back portion (of ear-flap 25) in the area of the temporary seal 24 may in fact fuse and be permanently sealed or stuck together as a result of seal formation. This is not disadvantageous; and in fact is precisely what is desired in this structure. This feature in fact contributes to the reliability of parting at the rupture interface aforementioned (that is, the interface between the backing 23 of partition 27 and th fusible layer 22 of the sheet forming ear-flap 26). In preferred structures, an additional feature of the composite area characterized as the area of the temporary seal structure is that the edge or terminal portion 28 of folded back sheet material extends slightly into the cavity of the envelope. It extends therein just sufficiently to serve as a protective member or flap over the area of the rupturable temporary seal in the event of accidental mild squeezing of the packet. It tends to lie against the opposing sheet material surface 16 (away from wall 17), and thereby protects the area of the rupture interface upon the on-rush of a packaged messy ingredient toward the temporary seal as a result of accidental squeezing of the packet.

Of course, if desired, both ear-flaps 25 and 26 may be formed in the shape of an outward projection of folded back sheet material as illustrated for the one ear-flap 25 in the drawing; and in such cases, the rupture is accomplished between the backing or non-fusible layer of each "partition" part of the sheet material at the temporary seal. Suitably, where this approach is employed, the backing material selected may exhibit weak sealing properties to permit later easy rupture, or a releasable or weak adhesive strip, or alternate rupturable seal means, may be added or employed between such face-to-face portions of backing layers.

For invertible packets, the depth dimension of the envelope cavity downwardly (or perpendicularly) from the temporary seal 24 is less than the length of the envelope cavity. Preferably this depth dimension of the cavity is no greater than two-thirds or even one-half the length of the temporary seal or length of the cavity. Temporary seals from about 5 centimeters up to about 15 or 20 centimeters along the length dimension of the evelope cavity are desirable; and cavity depths from about 2 to about 8 centimeters are desirable.

Especially significant benefit flowing from formation of packets as illustrated in the FIGS. 2 and 3 of the drawing is that of the economy of production and reliability (or uniformity or consistency) of temporary seal performance in use. From a production standpoint, the permanent and temporary seal structures conveniently can be formed using the same seal conditions, whether ultrasonic, dielectric, ordinary heat bars, or otherwise. The diverse nature of the surface characteristics on opposite sides of the sheet material forming the packet envelope cause the formation of permanent seals between face-to-face parts and temporary seals between back-to-face parts (as where the face of a sheet or a portion thereof is pressed against and sealed to the back of the sheet material). The nature of the backing (which is a non-thermoplastic organic polymeric film having a substantially continuous smooth and non-fibrous rear surface of essentially non-fusible character under conditions which effect fusion of the thermoplastic layer on the face or inner side of the sheet) contributes to the structure of the temporary seal as certainly as the fused thermoplastic layer firmly pressed thereagainst. Yet the lack of intermingled fused constituents between the abutting sheet surfaces makes it possible to separate or part the fused layer from the backing, with a neat parting surface for both sides of the sheets in the area of the temporary seal. A mechanical type temporary bonding of the opposing surfaces in the area of the temporary seal is indeed very critical; and to this end the exact nature of the backing surface of the sheet material forming the partition member for the temporary seal may vary or be modified to improve the strength of the seal for handling purposes prior to use of the packet, while still retaining the critical rupturable feature.

Preferably, the envelope containers (especially those formed to be turned inside out) include a recess-containing layer means fixed within the envelope cavity of the package. Containers having a recess-containing layer means are easily formed when the preferred sheet material aforedescribed is used. A recess-containing layer means serves to hold a messy packaged ingredient (such as a paste or grease) more or less in position or partially within limited recesses or openings between elements (such as fibers) forming the structure of that layer.

Thus, the ingredient is "carried" by that layer and is available for application to a surface after the packet is inverted or turned inside out by hand.

"Recess-containing" refers to recess openings such as irregular spaces of minute or small character between fibrous elements of a layer, or to a pattern of embossed indents or recesses in an interior layer (such as the thermoplastic layer) of the sheet material forming the envelope, or even to openings or passages in a sponge-like or porous layer or sheet material (such as polyurethane foam or other porous resinous material). The recess-containing layer might be a layer or sheet separate from the sheet material used to form the envelope; and it may be united inside (at least in part) the envelope as an internal tongue member at the time of forming the seal structures for the package or container. It preferably is a layer extending over and integral with the sheet material out of which the package is formed. The recess-containing layer and the thermoplastic layer could be one and the same in a suitable sheet material for forming the package. For example, fibrous elements of thermoplastic character (such as polyethylene) could solely be used to form a thermoplastic layer for a sheet material out of which the package is made. If desired, a mixture of thermoplastic and non-thermoplastic fibers (such as glass fibers or nylon fibers) could be used to form a layer having the thermoplastic requirement and a recess-containing property. In essence, recess-containing layers for the package teaching herein comprises a plurality of mini-recesses. Regardless of how the recess-containing layer for the container or package is formed, the critical relationship of fusible and non-fusible layers, as aforenoted, is maintained for sheet material employed in forming the envelope-like container. Preferably, the recess-containing layer means comprises a porous fibrous layer (suitably of non-woven filaments formed by "Rando" web techniques, or a flocked layer) adhered to and exposed on the fusible or thermoplastic side of the sheet material used to form the container.

Inversion of an invertible type package container is easily accomplished by turning it inside out by hand. Once the temporary seal 24 is ruptured, as by gripping the ear-flaps 25 and 26 between one's thumb and forefinger and pulling them apart, the envelope is easily turned inside out by pressing the bottom of the envelope through the opening formed by breaking the temporary seal. This places a packaged messy ingredient on the exterior. Then one may insert one's hand into the inverted pocket and use it to apply the messy ingredient to a surface without getting the messy ingredient on one's hands.

That which is claimed is:

1. A composite flexible sheet material especially useful in the packaging art, comprising
   i. a base sheet structure of permanently united layers including a thermoplastic polymeric resin layer which is non-sticky at room temperature but is flowable and fusible at predetermined sealing conditions of elevated temperature above 50° C and the application of pressure, and a polyester resin backing film which is substantially non-flowable and non-fusible at said sealing conditions, the rear surface of said backing film away from said thermoplastic layer being non-fibrous, said thermoplastic layer being of greater thickness than said backing film and being normally non-sticky to said rear surface of said backing film but being capable of forming a temporary peelable mechanical seal theragainst when subjected to said sealing conditions, any such temporary mechanical seal being free of intermingled fused constituents between said thermoplastic layer and said backing film, and
   ii. a recess-containing layer adhered to and exposed on said thermoplastic layer side of said base sheet structure, said recess-containing layer being non-compressed and consisting essentially of non-woven polyester resin fibers which are non-flowable and non-fusible at said sealing conditions and have open spaces therebetween, said open spaces being sufficiently extensive to be capable of mechanically holding and carrying an organic-diluent-containing messy composition within the same, said polyester resin fibers of said recess-containing layer being characterized by the fact that they are resistant to irretrievable adsorption of any said organic-diluent-containing messy composition, the quantity relationship between said fibers of said recess-containing layer and the material of said thermoplastic layer of said composite sheet material being such that said recess-containing layer is capable of being substantially submerged into said thermoplastic layer of said base sheet structure upon the application of said sealing conditions, and
   iii. a temporary peelable mechanical seal extending as a narrow band of no more than about one centimeter in width with material of said thermoplastic layer against the rear surface of said backing film and containing within said band of seal said recess-containing layer submerged into said thermoplastic layer, said temporary seal being spaced from edges of said base sheet structure and being rupturable at the interface between material of said thermoplastic layer and the rear surface of said backing film 2. The composite flexible sheet material of claim 1 additionally comprising a barrier layer between said backing film and said thermoplastic layer, said barrier layer contributing to the fluid-impervious of said sheet material.

3. The composite flexible sheet material of claim 1 wherein the thickness of said non-compressed recess-containing layer is greater than the thickness of said thermoplastic layer, said thickness of said recess-containing layer being at least about 50 microns up to about 1 millimeter, and wherein said quantity relationship between said fibers of said recess-containing layer and material of said thermoplastic layer further is such that the thickness of said recess-containing layer after being compressed as a result of said composite sheet material being subjected to said sealing conditions is no greater than approximately half the non-compressed thickness thereof and no more than about 25% greater than the thickness of said thermoplastic layer prior to being subjected to said sealing conditions.

4. The composite flexible sheet material of claim 1 wherein said backing film is between 5 and 60 microns thick, said thermoplastic layer is between about 25 and 125 microns thick, and said recess-containing layer is not greater than about 300 microns thick.

5. The composite flexible sheet material of claim 1 wherein a majority of the weight of said polyester fibers in said recess-containing layer is accounted for by oriented fibers extending in substantially the same direction in said layer and in substantially parallel relationship to said base sheet structure.

6. The composite flexible sheet material of claim 5, folded upon itself with the recess-containing layer thereof on the interior, and a band of seal juncture between the opposing folded sides of said sheet material, said band of seal juncture being along a line intersecting the direction of said oriented fibers of said sheet material in an approximately perpendicular manner.

7. A composite sheet material according to claim 5, having a band of seal juncture extending along a line intersecting the direction of said oriented fibers of said sheet material in an approximately perpendicular manner.

8. A structure formed by placing two composite sheet materials according to claim 5 in face to face relationship, with the recess-containing layer of each said sheet material on the interior, and a band of seal juncture joining said sheet materials together, said band of seal juncture being along a line intersecting the oriented fibers of at least one said sheet material in an approximately perpendicular manner.

* * * * *

UNITED STATES PATENT AND TRADEMARK OFFICE
CERTIFICATE OF CORRECTION

PATENT NO. : 4,044,180

DATED : August 23, 1977

INVENTOR(S) : Robert C. Baker

It is certified that error appears in the above-identified patent and that said Letters Patent are hereby corrected as shown below:

```
        Column 2, line 3,"]-" should be omitted.
        Column 6, line 30, "Can" should read --(An--.
        Column 6, line 54, "Suitable" should read
--Suitably--.
        Column 7, line 9, "end seals 20" should read
--end face-to-face portions of the folded sheet; and
lateral end seals 20--.
        Column 7, line 56, "th" should read --the--.
        Column 10, line 1, (Claim 1) "theragainst"
should read --thereagainst--.
```

Signed and Sealed this

Seventh Day of February 1978

[SEAL]

Attest:

RUTH C. MASON
Attesting Officer

LUTRELLE F. PARKER
Acting Commissioner of Patents and Trademarks